United States Patent
De Villele et al.

(10) Patent No.: US 11,043,131 B2
(45) Date of Patent: Jun. 22, 2021

(54) SYSTEMS AND METHODS FOR GENERATING A RECAPTURE PATH FOR AN AIRCRAFT

(71) Applicant: HONEYWELL INTERNATIONAL INC., Morris Plains, NJ (US)

(72) Inventors: Dorothee De Villele, Haute-Garonee (FR); Marek Batelka, Tisnov (CZ); Rajesh Chaubey, Karnataka (IN); Jim Rumbo, Phoenix, AZ (US); Kiran Mancheiah Venkataramana, Karnataka (IN); Daniel Corbel, Haute-Garonne (FR); Zdenek Moravek, Rozdrojovice (CZ); Ivan Lacko, Brno (CZ); Zdenek Jancik, Vysocina (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 197 days.

(21) Appl. No.: 16/285,367

(22) Filed: Feb. 26, 2019

(65) Prior Publication Data
US 2020/0273349 A1    Aug. 27, 2020

(51) Int. Cl.
*G08G 5/00* (2006.01)
*G08G 5/04* (2006.01)
*B64D 45/00* (2006.01)

(52) U.S. Cl.
CPC ........... *G08G 5/0039* (2013.01); *B64D 45/00* (2013.01); *G08G 5/0021* (2013.01);
(Continued)

(58) Field of Classification Search
CPC ...... G08G 5/00; G08G 5/0039; G08G 5/0021; G08G 5/0052; G08G 5/045; B64D 45/00;
(Continued)

(56) References Cited

U.S. PATENT DOCUMENTS

| | | | | |
|---|---|---|---|---|
| 3,289,203 A | * | 11/1966 | Gaylord | ................ G01S 13/913 342/33 |
| 4,706,198 A | * | 11/1987 | Thurman | ............. G08G 5/0013 701/120 |

(Continued)

FOREIGN PATENT DOCUMENTS

FR    2921151 A1    3/2009

*Primary Examiner* — Yonel Bealieu
(74) *Attorney, Agent, or Firm* — Lorenz & Kopf, LLP (57) ABSTRACT

Provided are enhanced flight guidance systems and methods for an aircraft. The method includes recognizing when the aircraft is in manual operation and an active flight path is different than the planned flight path. An interrupt is received and categorized as one of (i) obstacle, (ii) equipment/fuel, or (iii) pilot health monitor. A managed mode begins, including identifying a rejoining leg of the planned flight path at which to rejoin and a location on the rejoining leg at which to rejoin. A recapture path strategy is selected from (i) lateral, (ii) vertical, and (iii) mixed lateral and vertical. A recapture path to the location on the rejoining leg is computed. The computed recapture path includes speed targets and configuration requirements at dedicated points along the recapture path. Aircraft state data along the recapture path is predicted and guidance controls for the aircraft along the recapture path are generated.

20 Claims, 7 Drawing Sheets

(52) U.S. Cl.
CPC ............ *G08G 5/0052* (2013.01); *G08G 5/045* (2013.01); *B64D 2045/0085* (2013.01)

(58) Field of Classification Search
CPC ....... G01C 21/00; G01C 23/005; G01S 13/00; G01S 13/93; G01S 13/935; G01S 13/91; G01S 13/916; G01S 13/95; G01S 13/953; G01S 15/93; G01S 17/933; G05D 1/00; G05D 1/0061; G05D 1/0274; G05D 1/0088; G05D 1/0202
See application file for complete search history.

(56) References Cited

U.S. PATENT DOCUMENTS

| | | | |
|---|---|---|---|
| 4,750,127 A * | 6/1988 | Leslie | G05D 1/0005 244/183 |
| 4,947,350 A * | 8/1990 | Murray | G06F 30/18 702/181 |
| 6,112,141 A * | 8/2000 | Briffe | G01C 23/00 345/1.3 |
| 6,266,610 B1 * | 7/2001 | Schultz | G08G 5/0034 701/528 |
| 6,317,690 B1 * | 11/2001 | Gia | G01S 13/935 701/301 |
| 6,678,588 B2 | 1/2004 | He | |
| 7,024,287 B2 * | 4/2006 | Peckham | G01C 21/20 701/3 |
| 7,194,353 B1 | 3/2007 | Baldwin et al. | |
| 7,568,662 B1 | 8/2009 | Conner | |
| 7,589,646 B2 | 9/2009 | Glover | |
| 8,090,531 B2 | 1/2012 | Goutelard et al. | |
| 8,396,615 B2 | 3/2013 | Caillaud et al. | |
| 8,498,769 B2 | 7/2013 | Sacle et al. | |
| 8,688,363 B2 * | 4/2014 | Svoboda | G08G 5/003 701/121 |
| 8,761,965 B2 | 6/2014 | Righi et al. | |
| 8,843,303 B1 | 9/2014 | Young et al. | |
| 9,037,391 B2 | 5/2015 | Meyer et al. | |
| 9,625,261 B2 * | 4/2017 | Polansky | G08G 5/0021 |
| 2001/0023390 A1 * | 9/2001 | Gia | G01S 13/935 701/301 |
| 2007/0222665 A1 * | 9/2007 | Koeneman | G08G 5/0021 342/29 |
| 2009/0105890 A1 * | 4/2009 | Jones | G01C 21/00 701/1 |
| 2011/0270471 A1 * | 11/2011 | Andre | G05B 9/03 701/3 |
| 2016/0063867 A1 * | 3/2016 | Zammit | G05D 1/101 701/18 |
| 2016/0069688 A1 * | 3/2016 | Polansky | G05D 1/101 701/3 |
| 2017/0323573 A1 * | 11/2017 | Decker | G08G 5/0039 |
| 2018/0276999 A1 * | 9/2018 | Dacre-Wright | G08G 5/0052 |

* cited by examiner

SYSTEMS AND METHODS FOR GENERATING A RECAPTURE PATH FOR AN AIRCRAFT

STATEMENT REGARDING GOVERNMENT SPONSORED RESEARCH OR DEVELOPMENT

The project leading to this application has received funding from the Clean Sky 2 Joint Undertaking under the European Union's Horizon 2020 research and innovation programme under grant agreement No 807097.

TECHNICAL FIELD

The technical field generally relates to flight guidance systems, and more particularly relates to systems and methods for generating a recapture path for an aircraft operating in a manual mode to return to a planned flight path.

BACKGROUND

In various scenarios, a pilot may take over operational control of an aircraft and deviate from a planned flight path. Often, this is initiated by an air traffic control (ATC) command. During this manual operation, one or more interrupts could occur that indicate a need to exit the manual mode, put the aircraft in an automatic flight control mode, and return the aircraft to the planned flight path.

The referenced interrupts are events that trigger or indicate a need to exit the manual mode. The referenced interrupts can be categorized as obstacles, an equipment or fuel level issue, and a pilot health issue. Responsive to the interrupt, control must be switched from manual control to a guided control and it must be determined where best to rejoin the planned flight path. In addition to determining where, it must be determined how to rejoin the planned flight path. The where and how inform a desired recapture path. Determining the details of the recapture path is a technical problem. While available flight guidance systems provide useful information, enhanced flight guidance systems that provide technologically improved recapture path assistance are desired.

Accordingly, enhanced flight guidance systems and methods are desired. The desired enhanced flight guidance systems and methods respond to an interrupt received while in manual operation by integrating relevant information to strategically compute a recapture path, including predicting aircraft state data, and generating guidance controls along the recapture path. Technical effects of the desired system include the timely generation of the strategically computed recapture path for immediate and automatic execution (i.e., exiting the manual mode and taking control of aircraft operation). The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a flight guidance system for an aircraft is provided. The system includes: a source of a planned flight plan including a planned flight path with a stabilized approach; a source of navigation data including altitude, speed, heading, roll, bank, and location; a source of current aircraft state data including engine status, configuration, thrust status, fuel status, and flight mode; and a control module comprising a processor and memory, the processor operationally coupled to the source of a planned flight plan, the source of navigation data, and the source of aircraft state data, the control module thereby configured to: identify an active flight path different than the planned flight path when the aircraft is being operated in manual mode; receive an interrupt and categorize the interrupt as one of (i) obstacle, (ii) equipment/fuel, or (iii) pilot health monitor; and responsive to the interrupt, begin a managed mode; and while in managed mode: identify a rejoining leg of the planned flight path at which to rejoin the planned flight path; identify a location on the rejoining leg at which to rejoin; select a recapture path strategy from (i) lateral, (ii) vertical, and (iii) mixed lateral and vertical; compute a recapture path to the location on the rejoining leg using the selected recapture path strategy, the computed recapture path including speed targets and configuration requirements at dedicated points along the recapture path; predict aircraft state data along the recapture path; and generate guidance controls for the aircraft along the recapture path.

In an embodiment, a method for flight guidance is provided. The method includes: at a processor programmed with a recapture path program, executing the recapture path program to perform the operations of recognizing an active flight path different than the planned flight path when the aircraft is being operated in manual mode; receiving an interrupt and categorize the interrupt as one of (i) obstacle, (ii) equipment/fuel, or (iii) pilot health monitor; selecting a rejoining leg of the planned flight path; determining a location on the rejoining leg to rejoin; selecting a recapture path strategy from (i) lateral, (ii) vertical, and (iii) mixed lateral and vertical; computing a recapture path to the location on the rejoining leg using the selected recapture path strategy, the computed recapture path including speed targets and configuration requirements at dedicated points along the recapture path; predicting aircraft state data along the recapture path; and generating guidance controls for the aircraft along the recapture path.

In another embodiment, an aircraft comprising a flight guidance system is provided. The aircraft includes: a source of a planned flight plan including a planned flight path with a stabilized approach; a source of navigation data including altitude, speed, heading, and location; a source of current aircraft state data including engine status, configuration, thrust status, fuel status, and flight mode; a source of weather data; a memory programmed with a recapture path program; and a processor operationally coupled to the source of a planned flight plan, the source of navigation data, the source of weather data, the source of aircraft state data, and the memory, the processor, when executing the recapture path program, performing operations including: recognize that the aircraft is being operated in manual mode and on an active flight path different than the planned flight path; receive an interrupt and categorize the interrupt from among (i) obstacle, (ii) equipment/fuel, or (iii) pilot health monitor; identify a rejoining leg of the planned flight path at which to rejoin the planned flight path, and a location on the rejoining leg at which to rejoin, as a function of at least the aircraft state data and interrupt category; select a recapture path strategy from (i) lateral, (ii) vertical, and (iii) mixed lateral and vertical; compute a recapture path to the location on the rejoining leg using the selected recapture path strategy, the computed recapture path including speed targets and configuration requirements at dedicated points along the recapture path; and generate guidance controls for the aircraft along the recapture path.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, there is continued desire for enhanced flight guidance systems that determine when to retake control (i.e., switch from manual operation to flight controlled operation of the aircraft) and how to rejoin a planned flight plan. The provided enhanced flight guidance system can respond to a variety of interrupts that may occur while the aircraft is being operated in a manual mode. As mentioned, the interrupts may be categorized as an obstacle, equipment/fuel, or pilot health monitor interrupt. Examples of obstacle interrupts include terrain and weather hazards. Equipment/fuel interrupts are sourced from onboard systems, generally as an aspect of aircraft state data, described below. The pilot health monitor may generate an interrupt indicating a medical issue with the pilot. The provided enhanced flight guidance system responds to the interrupt by evaluating a plurality of relevant factors and selecting an appropriate recapture path strategy to thereby generate a customized recapture path that includes the associated guidance controls sufficient to take back control of the aircraft and to smoothly return the aircraft to its planned flight path. Provided enhancements over conventional flight guidance systems include:

Return path (i.e., recapture path) generation that includes evaluation of obstacles such as terrain and weather hazards Generated recapture path can be a closest path or shortest path, and can employ a lateral, vertical or mixed lateral and vertical strategy Generated recapture path can be lowest energy path, dissipating aircraft energy Generated recapture path can ensure stable approach criterion are met Generated recapture path includes associated speed control Recapture path generation and execution can occur automatically, i.e., without human input Exemplary embodiments process and integrate inputs using novel rules and algorithms to convert them into enhanced flight guidance that can be automatically implemented and can be displayed on an aircraft display system. The figures and descriptions below provide more detail.

Figure 1:
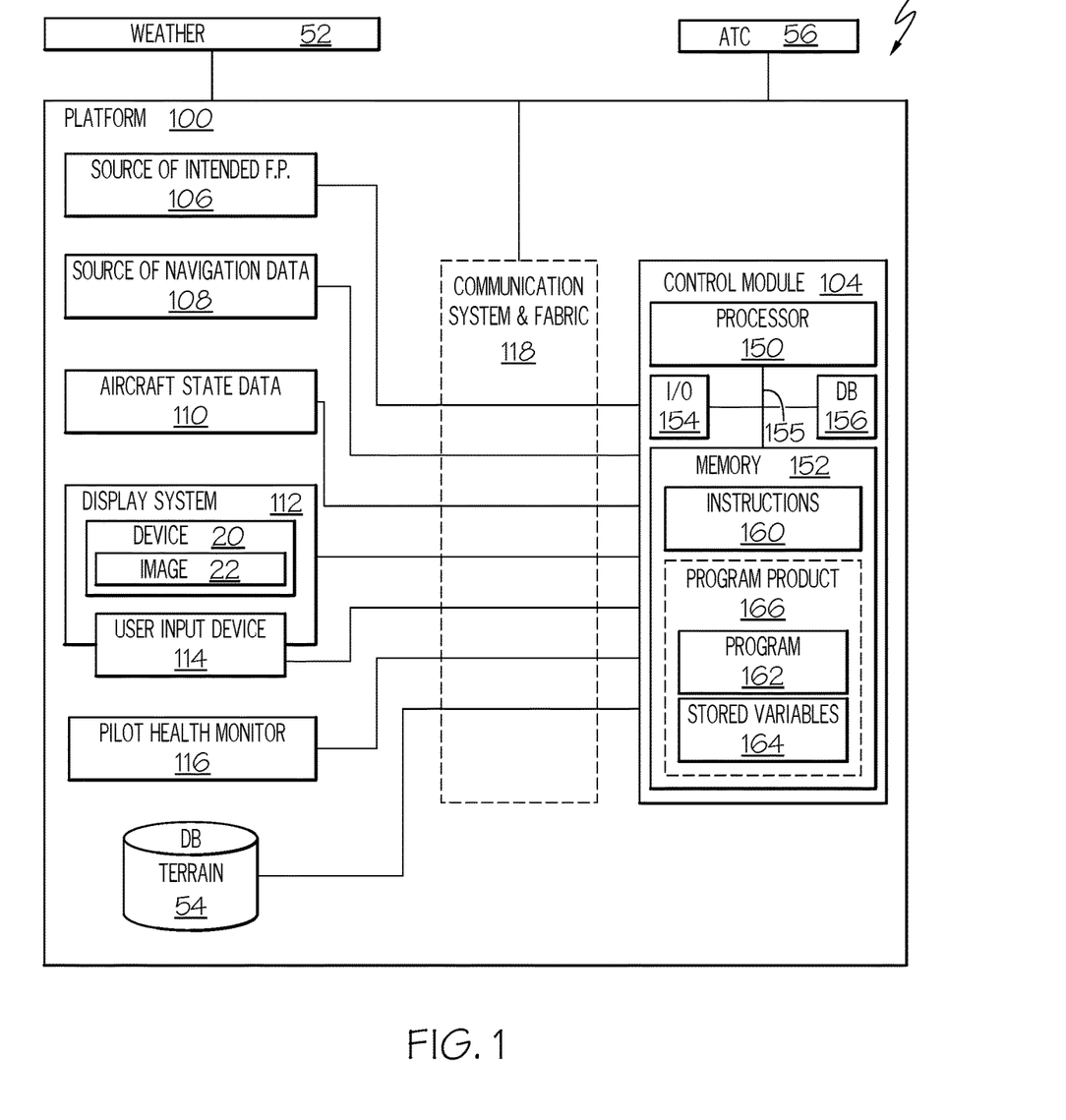
FIG. 1 is a block diagram of an enhanced flight guidance system for generating a recapture path for an aircraft, in accordance with an exemplary embodiment.

Turning now to FIG. 1, in an embodiment, enhanced flight guidance system 102 for generating a recapture path (also referred to herein as "system" 102) is generally associated with a mobile platform 100. In various embodiments, the mobile platform 100 is an aircraft, and is referred to as aircraft 100. The system 102 embodies the control module 104. In some embodiments, the control module 104 may be integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, a display system 112 and user input device 114 may also be part of the EFB or PED.

The control module 104 may be operationally coupled to any combination of the following aircraft systems: a communication system and fabric 118; a source of a planned/intended flight plan 106 (including a planned flight path with a stabilized approach) such as a navigation database (NavDB); a source of real-time aircraft navigation data 108, such as a navigation system; a source of aircraft state data 110; a source of weather information 52 (current, predicted, or current and predicted) a source of terrain data 54; and, a source of air traffic control (ATC 56) commands. Additionally, the system 102 may include a display system 112; a user input device 114; and, a pilot health monitor 116. The functions of these aircraft systems, and their interaction, are described in more detail below.

Real-time aircraft navigation data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. In some embodiments, the real-time aircraft navigation data is generated by a navigation system. The navigation system may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. The aircraft navigation data is made available, generally by way of the communication system and fabric 118, so other components, such as the control module 104 and the display system 112, may further process and/or handle the aircraft state data.

An intended/planned flight plan (FP) may include a planned flight path made up of a series of intended geospatial midpoints between a departure and an arrival. In some embodiments, the geospatial midpoints are called waypoints. The connections between each of the geospatial midpoints may be referred to as a "leg," and each geospatial midpoint and leg of the flight path have performance data associated therewith (non-limiting examples of the performance data include intended navigation data, such as: intended airspeed, intended altitude, intended acceleration, intended flight path angle, and the like). In various embodiments, the planned flight path may be part of an operational flight plan (OFP). A source of the intended flight path 106 may be a storage location or a user input device. In various embodiments, a navigation database, NavDB, is the source of the active trajectory or OFP. The NavDB is generally a storage location that may also maintain a database of flight plans, and/or information regarding terrain and airports and/or other potential landing locations (or destinations) for the aircraft 100.

The source of aircraft state data 110 generally provides, for each of a variety of aircraft 100 subsystems, current status/state and performance data. Examples of aircraft state data include: a flight mode, an engine status, an engine thrust level, a fuel level, a flap configuration, a braking status, a temperature control system status, and the like. As may be appreciated, the source of aircraft state data 110 may therefore include a variety of components, such as on-board detection sensors, which may be operationally coupled to the control module 104, central management computer, or FMS.

In various embodiments, a communications system and fabric 118 is configured to support instantaneous (i.e., real time or current) communications between on-board systems (i.e., the source of the intended flight path 106, the source of aircraft navigation data 108, the source of aircraft state data 110, the display system 112, and the source of terrain data 54), the control module 104, and the one or more external data source(s), such as the source of weather information 52, the air traffic control 56. As a functional block, the communications system and fabric 118 represents one or more transmitters, receivers, and the supporting communications hardware and software required for components of the system 102 to communicate as described herein. In various embodiments, the communications system and fabric 118 may implement additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communications system and fabric 118 also support the herein referenced controller pilot data link communications (CPDLC), such as through an aircraft communication addressing and reporting system (ACARS) router; in various embodiments, this feature may be referred to as a communications management unit (CMU) or communications management function (CMF). In summary, the communications system and fabric 118 may allow the aircraft 100 and the control module 104 to receive information that would otherwise be unavailable to the pilot and/or co-pilot using only the onboard systems.

The source of weather information 52 may include weather radar, a source for meteorological terminal aviation weather reports (METARS), and the like. The weather information is generally organized as a plurality (N) of regions, each region having an associated weather pattern, and each weather pattern having a corresponding severity rating, for example, high (also referred to as severe), moderate, low (also referred to as minor), and none. The severity rating is the one defined by the Federal Aviation Administration related to weather radar. The weather information may be organized in this manner before being transmitted onboard the aircraft 100 or may be organized this way by the control module 104 prior to further processing described below. In some embodiments, the source of weather information 52 is external to the aircraft 100, and in other embodiments, the source of weather information 52 is on-board the aircraft 100.

The source of terrain data 54 may be a database located on or off-board the platform 100. Air traffic control (ATC) 56 communicates wirelessly with the system 102. The pilot health monitor 116 may provide interrupts and information as a function of information from biometric sensors associated with the pilot. For example, the pilot health monitor may generate interrupts that indicate pilot unconsciousness or other medical conditions such as illness, cardiac instability, and drowsiness. The user input device 114 and the control module 104 are cooperatively configured to allow a user (e.g., a pilot, co-pilot, or crew member) to interact with display devices 20 in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used by a pilot to communicate with external sources, such as ATC, to modify or upload the program product 166, etc. In various embodiments, the display system 112 and user input device 114 are onboard the aircraft 100 and are also operationally coupled to the communication system and fabric 118. In some embodiments, the control module 104, user input device 114, and display system 112 are configured as a control display unit (CDU).

In various embodiments, the control module 104, alone, or as part of a central management computer (CMS) or a flight management system (FMS), draws upon data and information from the source of intended flight path 106 and source of aircraft navigation data 108 to provide real-time flight guidance for aircraft 100. The real time flight guidance may be provided to a user by way of images 22 on the display system 112, audible emissions from an audio system, or the like. For example, the control module 104 may compare an instantaneous position and heading of the aircraft 100 with planned flight plan data for the aircraft 100 and generate display commands to render images 22 showing these features and distinguishing them from each other. The control module 104 may further provide flight guidance responsive to associating a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the planned flight plan for the aircraft 100.

The control module 104 may perform display processing. In various embodiments, the control module 104 generates display commands for the display system 112 to cause the display device 20 to render thereon the image 22, comprising various graphical user interface elements, tables, icons, alerts, menus, buttons, and pictorial images, as described herein. The display system 112 is configured to continuously receive and process the display commands from the control module 104. The display system 112 includes a display device 20 for presenting an image 22. In various embodiments described herein, the display system 112 includes a synthetic vision system (SVS), and the image 22 is a SVS image. In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

The control module 104 may perform graphical processing. Responsive to display commands, renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 may be said to display various images and selectable options described herein. In practice, this may mean that the control module 104 generates display commands, and, responsive to receiving the display commands from the control module 104, the display system 112 displays, renders, or otherwise visually conveys on the display device 20, the graphical images associated with operation of the aircraft 100, and specifically, the graphical images as directed by the control module 104. In various embodiments, any combination of the control module 104, user input device 114, source of aircraft state data 110, and communication system and fabric 118, may be coupled to the display system 112 such that the display system 112 may additionally generate or render, on the display device 20, real-time information associated with respective aircraft 100 systems and components.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as comprising a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external source 50 during an initialization step of a process; it may also be programmed via a user input device 114.

During operation, the processor 150 loads and executes one or more programs, algorithms and rules embodied as instructions and applications 160 contained within the memory 152 and, as such, controls the general operation of the control module 104 as well as the system 102. The novel recapture path program 162 includes rules and instructions which, when executed by the processor 150, convert the processor 150/memory 152 configuration into the recapture path control module 104, which is a novel and enhanced flight guidance control module that performs the functions, techniques, and processing tasks associated with the operation of the enhanced flight guidance system 102 for generating a recapture path. Novel program 162 and associated stored variables 164 may be stored in a functional form on computer readable media, for example, as depicted, in memory 152. While the depicted exemplary embodiment of the control module 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the recapture path program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 and the source of terrain data, such as database 54 are integrated, either within the control module 104 or external to it. Additionally, in some embodiments, the source of terrain data 54 includes airport features data, and both the airport features data and terrain data are pre-loaded, and internal, to the control module 104.

The novel control module 104 may perform, responsive to an interrupt, the functions of generating a recapture path and generating associated guidance controls for various geospatial midpoints along the recapture path, each as a function of aircraft structures, systems, and performance. The processor 150 loads the instructions embodied in the program 162, thereby being programmed with program 162. When programmed with program 162, the processor 150 executes program 162, and the processor 150, the memory 152, and the database DB 156 form the novel enhanced flight guidance system 102.

First, the control module 104 recognizes the co-occurrence of an active flight path different than the planned flight path when the aircraft is being operated in manual mode. While in this co-occurrence scenario, the control module 104 receives an interrupt. Upon receiving an interrupt, the interrupt is categorized as one of (i) an obstacle, (ii) an equipment/fuel issue, or (iii) a pilot health monitor issue. The category of the interrupt may then be used in the determination of a recapture path strategy.

In various embodiments, the recapture path strategy may also be selected as a function of flight state, such as: the phase of flight, the current flight area and/or airspace, a current or target flight procedure, and relevant guidance (GUID) targets. In various embodiments, the recapture path strategy may also be selected as a function of the aircraft 100 state, such as current altitude, speed, heading, engine performance, aircraft gross weight (GW), and aircraft fuel level or fuel on board (FOB). In various embodiments, the recapture path strategy may also be selected based on potential aircraft roll, pitch, and yaw, as well as related comfort specifications. In an example, the shortest recapture path may have to be balanced against roll information, particularly when the phase of flight is a final approach, as in FIG. 9, below.

Figure 7:
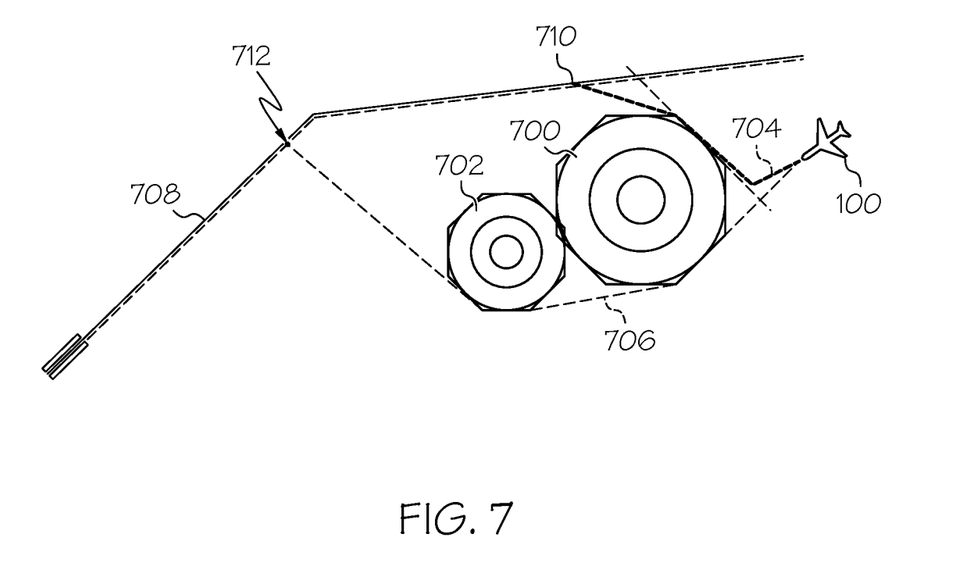
FIG. 7 depicts a lateral recapture path strategy, in accordance with an exemplary embodiment.
Figure 8:
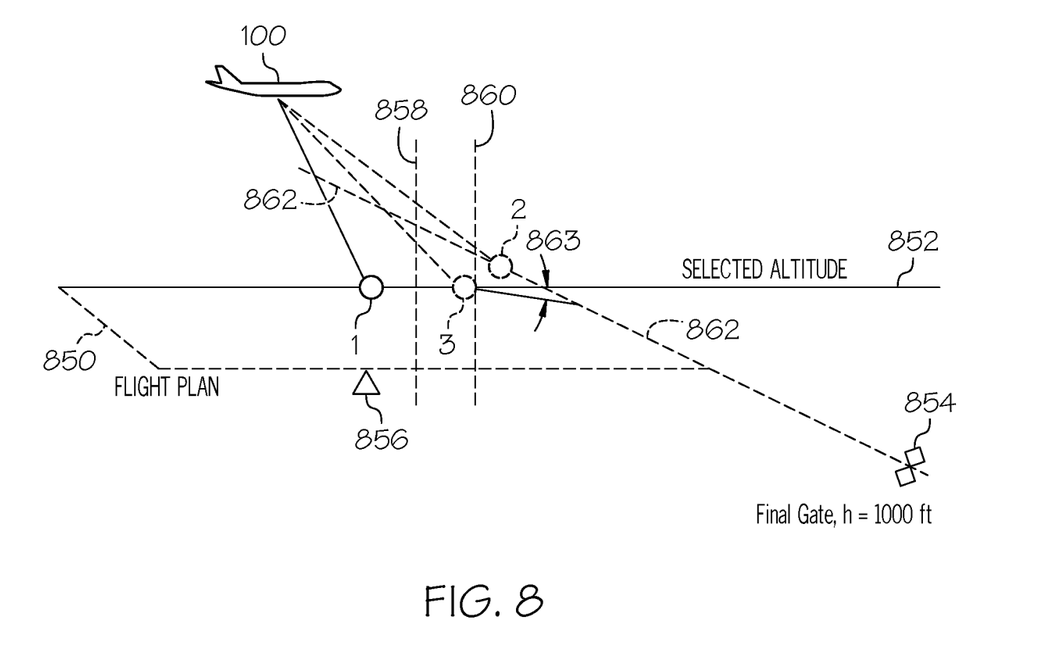
FIG. 8 depicts a vertical recapture path strategy, in accordance with an exemplary embodiment.
Figure 9:
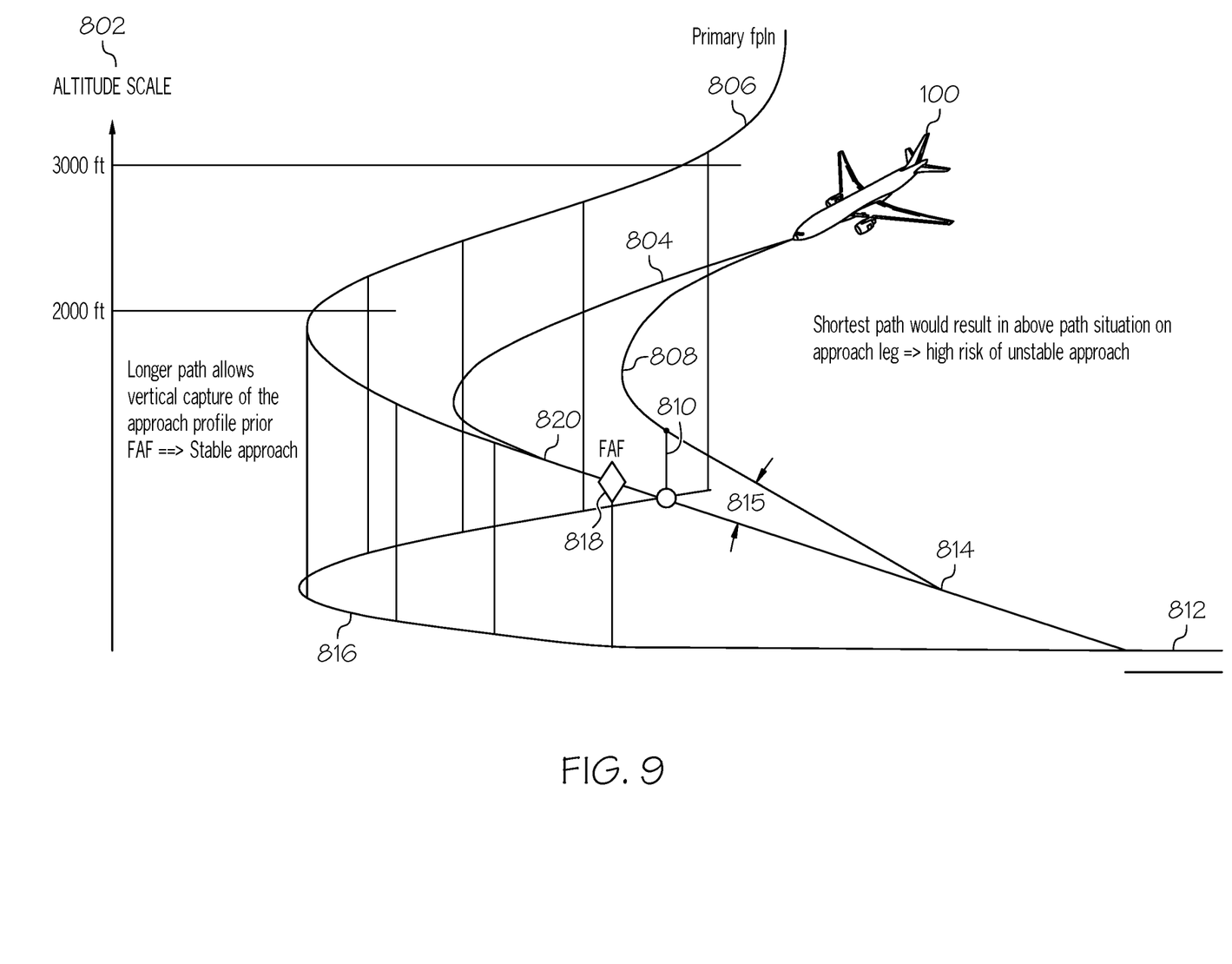
FIG. 9 depicts a mixed lateral and vertical recapture path strategy, in accordance with an exemplary embodiment.

The control module 104 selects a recapture path strategy from among lateral, vertical, and mixed lateral and vertical. Lateral recapture path strategies are generated, at least in part, as a function of the current location and heading of the aircraft 100 with respect to the geospatial midpoints constituting the planned flight path. FIGS. 2-7 are directed to lateral recapture path strategies. In FIGS. 8 and 9, vertical and mixed lateral and vertical recapture path strategies are described.

Figure 2:
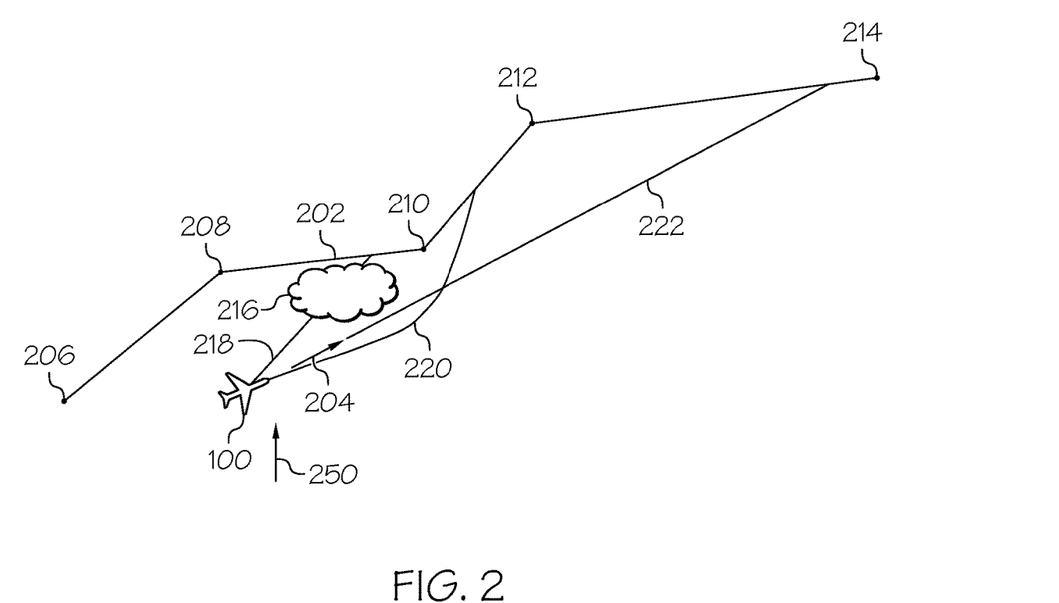
FIG. 2 is an image depicting several recapture strategies for when there is an obstacle to the shortest recapture path back to the planned flight path, in accordance with an exemplary embodiment.

FIG. 2 is a simplified image depicting several recapture strategies for when there is an obstacle to the shortest recapture path back to the planned flight path, in accordance with an exemplary embodiment. The planned flight path 202 is described by geospatial midpoints 206, 208, 210, 212, and 214, which are connected in series in the direction of travel of the aircraft 100. Aircraft 100 is on an active flight path (i.e., current flight path) with a heading 204. Therefore, the current flight path is not the planned flight path 202. The control module recognizes the co-occurrence of this scenario and the aircraft 100 being operated in manual mode. At a point on a trajectory defined by the current heading of aircraft 100, an interrupt 250 is received. Responsive to the interrupt 250, the system 102 begins a managed mode to retake control of the aircraft operation from manual mode. While in the managed mode, it employs one or more recapture path strategies to compute and evaluate a respective one or more potential recapture paths for the aircraft 100 to return to the planned flight path 202. As used herein, "recapture paths for the aircraft 100 to rejoin the planned flight path" is shortened to "recapture path"). Recapture strategies described herein can be prepared in advance while being in manual mode; and then, upon transition to managed mode, the processor can evaluate which one is the best, to provide a faster response of the system. An obstacle 216, such as a weather hazard, terrain, or other object, is between the trajectory defined by the current heading 204 of aircraft 100 and the planned flight path 202; accordingly, at least one of the strategies for generating a recapture path includes processing information detailing the obstacle. In the example, a shortest recapture path 218, goes right through the obstacle 216. A recapture path 220 is generated that has the shortest distance to the planned flight path while avoiding the obstacle 216. A recapture path 222 is generated that requires the least (i.e., most minimal) change in course for the aircraft to recapture the planned flight path 202. Recapture path 222 is likely the most perceptibly smooth recapture path. In various embodiments, the system 102 stays in the managed mode until the computed recapture path is executed and the aircraft 100 is safely landed.

Figure 3:
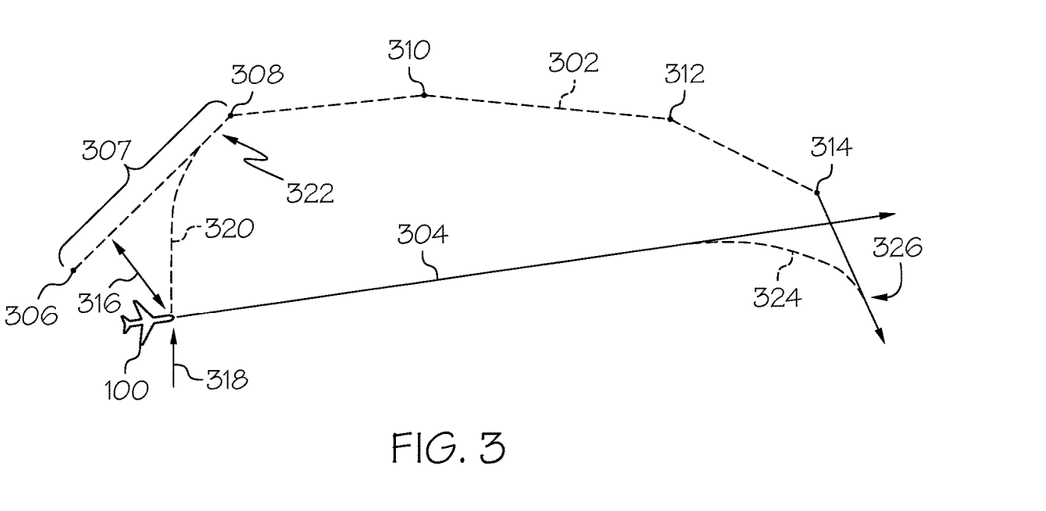
FIGS. 3-4 illustrate recapture strategies for when the aircraft's current heading intersects with the planned flight path (FIG. 3) and when the aircraft's current heading does not intersect with the planned flight path (FIG. 4), in accordance with an exemplary embodiment.
Figure 4:
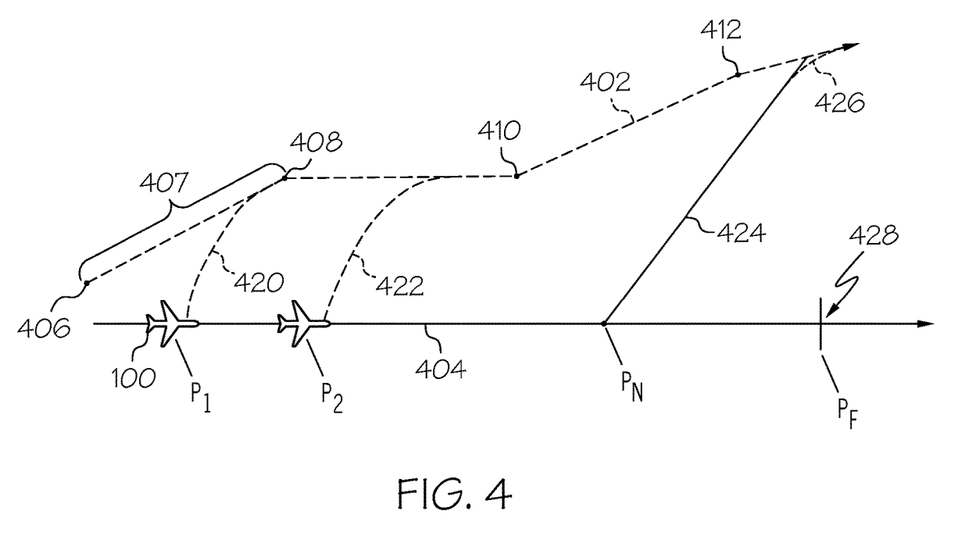

As may be appreciated, a selected recapture path strategy and generated recapture path may vary based on whether the trajectory of the aircraft at the current heading intersects with the planned flight path or not, this is illustrated in FIGS. 3 and 4. In FIG. 3, the aircraft's (100) current heading 304 intersects with the planned flight path 302. Planned flight path 302 includes geospatial midpoints 306, 308, 310, 312, and 314, connected in series. Leg 307 extends from geospatial point 306 to 308 and indicates a planned flight path leg at the time the interrupt 318 is received. When the interrupt 318 is received, the aircraft 100 is distance 316 from the leg 307, and the control module 104 generates a shortest recapture path for immediate response to the interrupt 318: recapture path 320, which would place the aircraft 100 back on the planned flight path at point 322, which is along leg 307, slightly before geospatial point 308. Advantageously, the control module 104 is not limited to only generating recapture paths associated with waypoints. To further illustrate this advantage, in another scenario, the control module 104 generates a temporally later recapture path 324, which places the aircraft 100 back on the planned flight path at point 326, which is post geospatial point 314, and is also intra-leg.

In FIG. 4, the aircraft's (100) current heading 404 does not intersect with the planned flight path 402. Planned flight path 402 includes geospatial midpoints 406, 408, 410, and 412 connected in series in the direction of travel of the aircraft 100. Leg 407 is the planned flight path leg. Points P1, P2, PN and PF are in series on a trajectory defined by the heading 404 of the aircraft 100, and therefore depict locations as well as points in time during the aircraft travel. The control module 104 may, responsive to processed inputs, generate one or more of: the recapture path 420 to recapture the planned flight path from point P1, the recapture path 422 to recapture the planned flight path from point P2, and a change to heading 424 at point PN. Point PF represents a final point at 428 along the trajectory of the heading 404 for which a recapture path can be generated.

Figure 5:
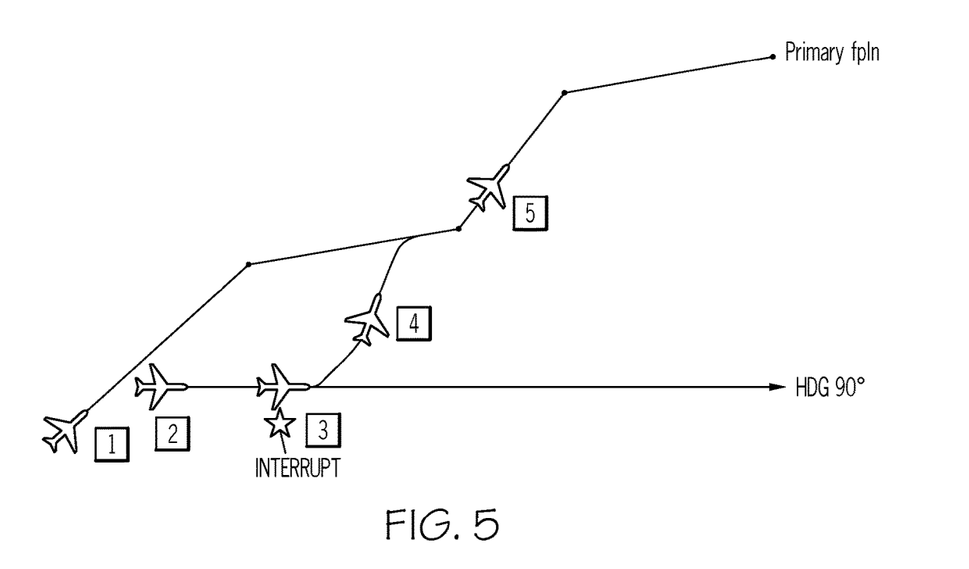
FIGS. 5-6 depict various use cases for the enhanced flight guidance system for generating a recapture path for an aircraft.
Figure 6:
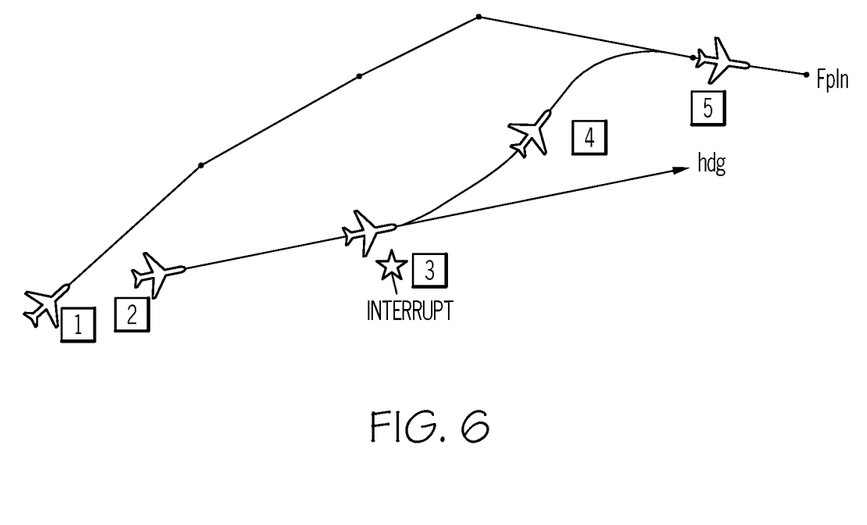

The concepts introduced in FIGS. 2-4 may be further illustrated with various use cases depicted in FIGS. 5-6. In FIG. 5, aircraft 100 is at an initial point 1, traveling along the planned flight path (labeled primary fpin). The aircraft 100 is in a "cruise" phase of flight and the aircraft 100 is flying in all managed modes. A received ATC instruction to fly in a manual mode at heading 90 degrees (HDG 90') is received by the system 102, and at point 2, the pilot changes course of the aircraft 100 to HDG 90'. An interrupt 3 is received, and the control module 104 categorizes the interrupt as one of: (i) obstacle, (ii) equipment/fuel, or (iii) pilot health monitor. In some embodiments, the control module 104 next determines that there is no need to re-route to a diversion airport before further responding to the interrupt. Responsive to the interrupt 3, the control module 104 begins a managed mode in which it generates/computes a recapture path. The control module 104 selects a rejoining leg of the planned flight path at which to rejoin the planned flight path. The control module 104 selects, as a function of the interrupt category and rejoining leg, a recapture path strategy from among a variety of available recapture path strategies. In an embodiment, the control module 104 selects a recapture path strategy from among (i) lateral, (ii) vertical, and (iii) mixed lateral and vertical. The control module 104 generates the recapture path 4 and automatically guides the aircraft 100, along recapture path 4, back to the planned flight path at 5. As may be understood from the figures, the control module 104 may determine anywhere (i.e., any location) along the rejoining leg to rejoin the aircraft 100, and the generated recapture path may return the aircraft 100 to the rejoining leg at the determined location of the selected rejoining leg. In order to automatically guide the aircraft 100 back to the planned flight path, the control module generates flight guidance commands along the recapture path 4 and re-takes control as LNAV and/or NAV (lateral navigation and/or navigation) from the previous manual operation at 2 and 3.

FIG. 6 depicts an approach and descent use case. At 1, the aircraft 100 is flying in all managed modes along the planned flight path, and in an approach and/or descent phase of flight. An ATC instruction "Fly HDG 60" is received by the system 102. At 2, the pilot begins manual control and changes course to adhere to the instruction to fly at heading 60'. At 3, an interrupt is received. The control module 104 categorizes the interrupt, as one of: (i) obstacle, (ii) equipment/fuel, or (iii) pilot health monitor. Responsive to the interrupt 3, the control module 104 begins a managed mode in which it generates a recapture path. The control module 104 selects, at least in part as a function of the interrupt category, a recapture path strategy from among a variety of supported recapture path strategies. In an embodiment, the control module 104 (i.e., the programmed processor 150) selects a recapture path strategy from among (i) lateral, (ii) vertical, and (iii) mixed lateral and vertical. In this use case, the control module 104 further selects a recapture path strategy to ensure a stable approach and to avoid undue level flight during the approach and descent. As used herein, avoiding undue level flight means minimizing a distance to a destination while maintaining stability. As described below, in descent and approach phases of flight, the control module 104 (i.e., the programmed processor 150) considers vertical trajectory to ensure a stable approach and landing; this does not mean pure lateral recapture path strategy is impossible during a descent and approach phase of flight, but a stable approach and landing is ensured. The control module 104 generates the recapture path 4 and automatically guides the aircraft 100, along recapture path 4, back to the planned flight path at 5. In order to automatically guide the aircraft 100 back to the planned approach and/or descent, the control module generates flight guidance commands along the recapture path 4 and re-takes control as LNAV and/or NAV from the previous manual operation at 2 and 3.

As mentioned, generating the recapture path includes selecting from among one or more strategies. The above described lateral recapture path strategies are generated as a function of the current location and heading of the aircraft 100 with respect to the geospatial midpoints constituting the planned flight path. However, in certain scenarios, lateral path recapture strategy is affected by an interrupt that is an obstacle such as an object or weather hazard. In FIG. 7, an exemplary lateral strategy enhanced with obstacle avoidance is depicted. The control module receives an interrupt and categorizes it as an obstacle interrupt. The control module 104 processes one or more of weather data and terrain data to identify the location, area, and a center of the obstacle(s). In FIG. 7, the obstacles are terrain 1 (700) and terrain 2 (702). The control model 104 employs an obstacle avoidance strategy to block the area of the obstacle from consideration prior to generating the recapture path(s). In the exemplary embodiment, the control module 104 employs an octagon method, constructing octagon shapes, centered on the center of the obstacle, to block out areas associated with obstacles. The control module 104 constructs a first octagon shape of an area that is large enough to completely surround terrain 1, and a second octagon shape of an area that is large enough to completely surround terrain 2. The selected octagon areas incorporate a preprogrammed safety margin.

The control module 104 generates one or more recapture paths after blocking the obstacles. The recapture paths may pass alongside the octagons and therefore, may take a shape that reflects one or more sides of the octagons. In FIG. 7, a first recapture path 704 recaptures the planned flight path 708 at 710, by altering course prior to reaching the area blocked by the obstacle(s), and a second recapture path 706 recaptures the planned flight path 708 at 712, by altering course after passing by the area blocked by the obstacle(s).

An exemplary vertical strategy is shown in FIG. 8. Aircraft 100 is located above the planned flight path 850 and has a landing destination 854. In this example, the rejoining leg is the ILS 862 landing. A pre-programmed selected altitude 852 is employed to determine the vertical path to recapture a trajectory of the instrument landing system ILS 862 (i.e., an ILS extension). If the aircraft 100 is above the ILS extension as shown in FIG. 8, the intersection with selected altitude creates three options. Option (1), when the intersection with the ILS extension is in front of the first threshold 858, aircraft recapture path descends to the selected altitude 852 and continues horizontally to the ILS 862 for landing. Option (2), when the intersection with the ILS 862 is behind the second threshold 860, the aircraft recapture path bends to intersect with an extension of the ILS. Option (3), when the intersection with the ILS 862 is between the first threshold 858 and the second threshold 860, the aircraft recapture path descends to the selected altitude 852 and then descends at a small angle 863 toward the ILS 862. In an embodiment, a small angle 863 is less than 5 degrees. The definition of a small angle 863 is aircraft (and condition) dependent; for example, in an embodiment, it is chosen to affect deceleration assuming the use of extended flaps and airbrakes. In another example, not shown, if the aircraft 100 is below the ILS 862 extension, the recapture path includes descending to the selected altitude 852 and from there (i) traveling horizontally to the ILS 862 when there is enough distance to do so, or from there (ii) descending at a small angle 863 to intersect with the ILS 862.

In FIG. 9, a mixed lateral and vertical recapture path strategy is depicted in a three-dimensional drawing showing a vertical approach profile with planned flight path 806 to a runway 812. An altitude scale 802 along the left side depicts from zero to 3000 feet above ground. The aircraft 100 is descending vertically and tracing out a lateral path demarked at 816. The planned flight path 806 includes a final approach fix (FAF 818). Aircraft 100 is not on the planned flight path 806 when the interrupt is received and the control module 104 begins the managed mode. The control module 104 generates a shortest recapture path 808 that rejoins at 814. The shortest recapture path 808 rejoins the descent leg after the FAF 818, which means it is rejoining at a steep and/or sharp angle 815. As used herein, a steep and/or sharp angle is less than 45 degrees. Additionally, the shortest recapture path 808 rejoins the descent leg in an above-path situation (depicted by the vertical bar 810). The control module 104 determines, based on the angle 815 and the above path distance, that although the recapture path 808 is shortest, it poses an unacceptable risk of an unstable approach. The control module 104 then generates a longer recapture path 804, which rejoins at 820 and allows vertical recapture of the approach profile prior to the FAF 818 and enables a stable approach. In an embodiment, the mixed lateral and vertical strategy is used to compute a most energy efficient descent to the stabilized approach.

The control module 104 generates guidance controls for the aircraft 100 to execute the determined recapture path. In addition to the guidance that directs the aircraft along the lateral and/or vertical path, the control module 104 generates performance and speed targets for geospatial midpoints along the recapture path. As stated, the various waypoints or geospatial midpoints making up the planned flight path include performance and speed targets; accordingly, a leg that connects any two waypoints has associated performance and speed targets that are informed by the performance and speed targets at the connected waypoints. Therefore, the control module 104 assures that the aircraft 100 arrives at the determined rejoining leg meeting the performance and speed associated with the rejoining leg. The control module 104 evaluates the current aircraft performance and speed and the rejoining leg performance and speed targets to create a deceleration or acceleration profile associated with the recapture path. In managed mode, the control module 104 controls the performance and speed of the aircraft 100 as it guides the aircraft 100 along the recapture path.

Figure 10:
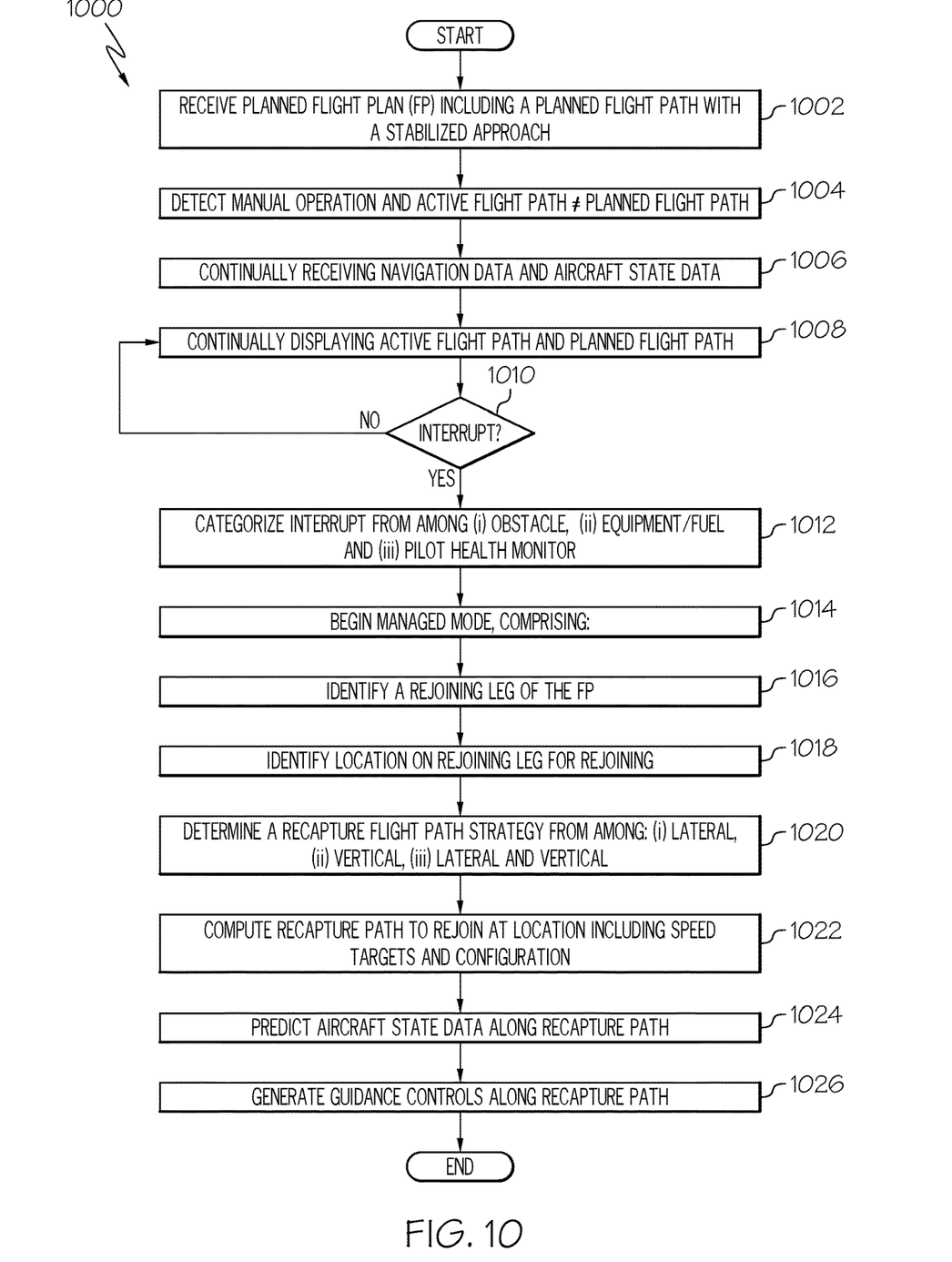
FIG. 10 depicts a method for generating a recapture path for an aircraft, in accordance with an exemplary embodiment.

The system 102 may make its determinations and selections in accordance with a method such as method 1000 of FIG. 10. With continued reference to FIGS. 1-9, a flow chart is provided for a method 1000 for providing a system 102, in accordance with various exemplary embodiments. Method 1000 represents various embodiments of a for weather impact prediction. For illustrative purposes, the following description of method 1000 may refer to elements mentioned above in connection with FIG. 1. In practice, portions of method 1000 may be performed by different components of the described system. It should be appreciated that method 1000 may include any number of additional or alternative tasks, the tasks shown in FIG. 3 need not be performed in the illustrated order, and method 1000 may be incorporated into a more comprehensive procedure or method having additional functionality not described in detail herein. Moreover, one or more of the tasks shown in FIG. 10 could be omitted from an embodiment of the method 1000 if the intended overall functionality remains intact.

The method starts, and the control module 104 is initialized and the system 102 is in operation. Initialization may comprise uploading or updating instructions and applications 160, program 162, and various display and formatting instructions that may be stored in the database 156. Stored variables may include, for example, configurable, preprogrammed values, thresholds, small angle definitions, parameters for setting up a user interface, the shapes used in recapture path strategies, various colors and/or visually distinguishing techniques used for depicting recapture paths, and related icons and alerts. In some embodiments, program 162 includes additional instructions and rules for rendering information differently based on type of display device in display system 112. Initialization may also include identifying external sources and/or external signals and the communication protocols to use with each external source.

At 1002, a planned flight plan is received, including a planned flight path with a stabilized approach. At 1004, the method 1000 detects that the aircraft is being operated in manual mode and that the current/active flight path is not the same as the planned flight path. At 1006, navigation data and aircraft state data are continually received. In various embodiments, at 1006, weather data is received and/or terrain data is accessed. At 1008, the method 1000 continually displays the active/current flight path and the planned flight path. At 1010, if an interrupt is received, it proceeds to 1012. At 1010, if an interrupt is not received, it cycles back to any of 1004, 1006 or 1008. As may be appreciated, the display system 112 continuously updates the lateral image 22 to indicate the aircraft 100 at its current position and with terrain and weather imagery based on received data. At 1012, a received interrupt is categorized as one of (i) obstacle, (ii) equipment/fuel, or (iii) pilot health monitor. At 1014, responsive to the interrupt, a managed mode begins. While in managed mode, the method identifies a rejoining leg of the FP (1016) and selects a location on rejoining leg for rejoining it (1018). The control module 104 supports rejoining the rejoining leg at any location along the rejoining leg. Steps 1016 and 1018 may be based in part on the category of the interrupt. At 1020, a recapture path strategy is determined from among (i) lateral, (ii) vertical, and (iii) mixed lateral and vertical. At 1022, the method employs the determined recapture path strategy to compute a recapture path to rejoin at the location. In some embodiments, the rejoining leg and or the location on the rejoining leg are a function of the interrupt category and the selected strategy. At 1022, more than one recapture path may be generated and evaluated by the control module 104, prior to selecting just one recapture path to execute (see, for example, FIG. 9). As mentioned above, in some embodiments, the recapture paths are generated in advance, and at 1022 the recapture paths are simply evaluated to determine which is the most appropriate. The computed/generated recapture path includes speed targets and configuration requirements at dedicated points along the recapture path. At 1024, the method predicts aircraft state data along the recapture path, and at 1026, the control module 104 generates guidance controls along the recapture path. After 1026, the method 1000 is shown as ending, but it is understood that this generated recapture path and associated performance and guidance parameters may then be executed automatically, meaning that the control module 104 retakes control of the operation of the aircraft 100 and executes the determined recapture path.

Thus, technologically improved flight guidance systems and methods are provided that respond to an interrupt received while in manual mode and off-path by generating a recapture path and guidance for automatic guidance of an aircraft back along the recapture path to a planned flight plan.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight guidance system for an aircraft, comprising:
a source of a planned flight plan including a planned flight path with a stabilized approach;
a source of navigation data including altitude, speed, heading, roll, bank, and location;
a source of current aircraft state data including engine status, configuration, thrust status, fuel status, and flight mode; and
a control module comprising a processor and memory, the processor operationally coupled to the source of a planned flight plan, the source of navigation data, and the source of aircraft state data, the control module thereby configured to:
identify an active flight path different than the planned flight path when the aircraft is being operated in manual mode;
receive an interrupt and categorize the interrupt as one of (i) obstacle, (ii) equipment/fuel, or (iii) pilot health monitor; and
responsive to the interrupt, begin a managed mode; and while in managed mode:
identify a rejoining leg of the planned flight path at which to rejoin the planned flight path;
identify a location on the rejoining leg at which to rejoin;
select a recapture path strategy from (i) lateral, (ii) vertical, and (iii) mixed lateral and vertical;
compute a recapture path to the location on the rejoining leg using the selected recapture path strategy, the computed recapture path including speed targets and configuration requirements at dedicated points along the recapture path;
predict aircraft state data along the recapture path; and
generate guidance controls for the aircraft along the recapture path.

2. The flight guidance system of claim 1, wherein, while in managed mode, the control module is further configured to:
compute the recapture path to further be a shortest path, based on the aircraft state data, to return to the planned flight path; and
wherein the recapture flight path strategy for the shortest path is selected based on a phase of flight and roll information.

3. The flight guidance system of claim 2, wherein the control module is further configured to,
when the strategy is vertical, employ a vertical method comprising:
extending a current aircraft position and location toward a selected altitude of the planned flight path, to thereby create a maximum descent angle; and
generating a recommended descent angle based on the maximum descent angle and the current aircraft state data.

4. The flight guidance system of claim 3, wherein the control module is further configured to, when the strategy is mixed lateral and vertical:
employ an octagon method and the vertical strategy to compute the recapture path that is a most energy efficient descent to a stabilized approach.

5. The flight guidance system of claim 3, wherein the control module is further configured to, when the strategy is lateral, and the interrupt is an obstacle, employ an octagon method comprising constructing an octagon surrounding the obstacle.

6. The flight guidance system of claim 5, further comprising:
a source of weather data operationally coupled to the control module; and
a source of terrain data operationally coupled to the control module; and
wherein the control module is further configured to categorize the interrupt as the obstacle interrupt based on the weather data or the terrain data.

7. The flight guidance system of claim 6, wherein the control module is further configured to automatically guide the aircraft using the recapture path.

8. A method for flight guidance, comprising:
at a processor programmed with a recapture path program, executing the recapture path program to perform the operations of
recognizing an active flight path different than the planned flight path when the aircraft is being operated in manual mode;
receiving an interrupt and categorize the interrupt as one of (i) obstacle, (ii) equipment/fuel, or (iii) pilot health monitor;
selecting a rejoining leg of the planned flight path;
determining a location on the rejoining leg to rejoin;
selecting a recapture path strategy from (i) lateral, (ii) vertical, and (iii) mixed lateral and vertical;
computing a recapture path to the location on the rejoining leg using the selected recapture path strategy, the computed recapture path including speed targets and configuration requirements at dedicated points along the recapture path;
predicting aircraft state data along the recapture path; and
generating guidance controls for the aircraft along the recapture path.

9. The method of claim 8, further comprising:
selecting a vertical strategy and employing a vertical method comprising:
extending a current aircraft position and location toward a selected altitude of the planned flight path, to thereby create a maximum descent angle; and
generating a recommended descent angle based on the maximum descent angle and the current aircraft state data.

10. The method of claim 9, further comprising, selecting a mixed lateral and vertical strategy comprising:
employing an octagon method and the vertical strategy to compute the recapture path that is a most energy efficient descent to a stabilized approach.

11. The method of claim 9, wherein, when the strategy is lateral, and the interrupt is an obstacle, employing an octagon method comprising constructing an octagon surrounding the obstacle.

12. The method of claim 11, further comprising:
receiving weather data from a source of weather data; and
receiving terrain data from a source of terrain data; and
categorizing the interrupt as the obstacle interrupt based on the weather data or the terrain data.

13. The method of claim 12, further comprising, automatically guiding the aircraft using the recapture path.

14. An aircraft comprising a flight guidance system, comprising:

a source of a planned flight plan including a planned flight path with a stabilized approach;

a source of navigation data including altitude, speed, heading, and location;

a source of current aircraft state data including engine status, configuration, thrust status, fuel status, and flight mode;

a source of weather data;

a memory programmed with a recapture path program; and a processor operationally coupled to the source of a planned flight plan, the source of navigation data, the source of weather data, the source of aircraft state data, and the memory, the processor, when executing the recapture path program, performing operations including:

recognize that the aircraft is being operated in manual mode and on an active flight path different than the planned flight path;

receive an interrupt and categorize the interrupt from among (i) obstacle, (ii) equipment/fuel, or (iii) pilot health monitor;

identify a rejoining leg of the planned flight path at which to rejoin the planned flight path, and a location on the rejoining leg at which to rejoin, as a function of at least the aircraft state data and interrupt category;

select a recapture path strategy from (i) lateral, (ii) vertical, and (iii) mixed lateral and vertical;

compute a recapture path to the location on the rejoining leg using the selected recapture path strategy, the computed recapture path including speed targets and configuration requirements at dedicated points along the recapture path; and generate guidance controls for the aircraft along the recapture path.

15. The aircraft of claim 14, wherein the processor, when executing the recapture path program further:

computes the recapture path to further be a shortest path, based on the aircraft state data, to return to the planned flight path; and wherein the recapture flight path strategy for the shortest path is selected based on a phase of flight and roll information.

16. The aircraft of claim 15, wherein the processor, when executing the recapture path program further:

when the strategy is vertical, employs a vertical method comprising:

extending a current aircraft position and location toward a selected altitude of the planned flight path, to thereby create a maximum descent angle; and generating a recommended descent angle based on the maximum descent angle and the current aircraft state data.

17. The aircraft of claim 16, wherein the processor, when executing the recapture path program further:

when the strategy is mixed lateral and vertical:

employs an octagon method and the vertical strategy to compute the recapture path that is a most energy efficient descent to a stabilized approach.

18. The aircraft of claim 16, wherein the processor, when executing the recapture path program further: when the strategy is lateral, and the interrupt is an obstacle, employs an octagon method comprising constructing an octagon surrounding the obstacle.

19. The aircraft of claim 18, further comprising:

a source of terrain data operationally coupled to the processor; and wherein the processor processes the terrain data to categorize the interrupt as the obstacle interrupt.

20. The aircraft of claim 19, wherein the processor, when executing the recapture path program further automatically guides the aircraft using the recapture path.

* * * * *